US011323194B2

(12) United States Patent
    Wen

(10) Patent No.: US 11,323,194 B2
(45) Date of Patent: May 3, 2022

(54) CROSS DOMAIN SYNCHRONIZATION IN A COMMUNICATION NETWORK

(71) Applicant: Telefonaktiebolaget LM Ericsson (publ), Stockholm (SE)

(72) Inventor: Gan Wen, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/635,064

(22) PCT Filed: Aug. 4, 2017

(86) PCT No.: PCT/CN2017/095982
    § 371 (c)(1),
    (2) Date: Jan. 29, 2020

(87) PCT Pub. No.: WO2019/024079
    PCT Pub. Date: Feb. 7, 2019

(65) Prior Publication Data
    US 2020/0252150 A1    Aug. 6, 2020

(51) Int. Cl.
    *H04J 3/06*    (2006.01)
(52) U.S. Cl.
    CPC ......... *H04J 3/0641* (2013.01); *H04J 3/0667* (2013.01); *H04J 3/0673* (2013.01); *H04J 3/0679* (2013.01)
(58) Field of Classification Search
    CPC ...... H04J 3/0641; H04J 3/0667; H04J 3/0673; H04J 3/0679; H04J 3/0638
    See application file for complete search history.

(56) References Cited

U.S. PATENT DOCUMENTS

2010/0135189 A1* 6/2010 Shi ................. H04J 3/0679
                                                    370/254
2013/0089170 A1   4/2013 Chiesa et al.
(Continued)

FOREIGN PATENT DOCUMENTS

CN    102263631 A    11/2011
CN    103490840 A    1/2014
(Continued)

OTHER PUBLICATIONS

Levesque et al., "A Survey of Clock Synchronization Over Packet-Switched Networks", IEEE (Year: 2016).*
(Continued)

*Primary Examiner* — Omer S Mian
(74) *Attorney, Agent, or Firm* — Rothwell, Figg, Ernst & Manbeck, P.C.

(57) ABSTRACT

A method for communications is proposed. The method may comprise receiving, by a first network node, a report of clock quality of a second network node from a third network node. A clock of the first network node is selected as a master clock for synchronization in a first timing domain, a clock of the second network node is selected as a is selected as a master clock for synchronization in a second timing domain, and the third network node is attached to at least the first timing domain and the second timing domain. Based at least in part on the received report, it may be determined whether to synchronize the first timing domain to the second timing domain. In response to the determination of synchronizing the first timing domain to the second timing domain, the first network node can obtain timing information of the second network node from the third network node. The method may further comprise tuning the clock of the first network node to synchronize the first timing domain to the second timing domain, based at least in part on the timing information of the second network node.

20 Claims, 11 Drawing Sheets

(56) References Cited

U.S. PATENT DOCUMENTS

2015/0222413 A1    8/2015  Pietilainen
2018/0351676 A1*  12/2018  Butterworth ...... H04W 56/0015
2020/0036571 A1*   1/2020  Witana ................ H04L 41/0213

FOREIGN PATENT DOCUMENTS

EP          2207286 A1    7/2010
WO       2016065763 A1    5/2016

OTHER PUBLICATIONS

Kero et al, "Performance and Reliability Aspects of Clock Synchronization Techniques for Industrial Automation", IEEE (Year: 2019).*

Ronen, "Synchronization Monitoring in IEEE1588 Synchronization Networks" IEEE (Year: 2013).*

Extended Search Report issued in corresponding European Application No. 17919794.2, dated Jul. 9, 2020, 9 pages.

"Precision time protocol telecom profile for frequency synchronization; G.8265.1/Y.1365.1 (Oct. 2010)", ITU-T Standard, International Telecommunication Union, Geneva; CH, No. G.8265.1/Y.1365.1, (Oct. 7, 2010), pp. 1-30, XP817467816.

International Search Report and the Written Opinion of the International Searching Authority, issued in corresponding International Application No. PCT/CN2017/095982, dated Mar. 27, 2018, 9 pages.

IEEE, "IEEE Standard for a Precision Clock Synchronization Protocol for Networked Measurement and Control Systems" IEEE Std 1588™—2008 (Revision of IEEE Std 1588-2002), 289 pages.

* cited by examiner ered as admissions about what is in the prior art or
CROSS DOMAIN SYNCHRONIZATION IN A COMMUNICATION NETWORK

CROSS REFERENCE TO RELATED APPLICATION(S)

This application is a 35 U.S.C. § 371 National Phase Entry Application from PCT/CN2017/095982, filed Aug. 4, 2017, designating the United States, the disclosure of which is incorporated herein by reference in its entirety.

FIELD OF THE INVENTION

The present disclosure generally relates to communication networks, and more specifically, to network synchronization.

BACKGROUND

This section introduces aspects that may facilitate a better understanding of the disclosure. Accordingly, the statements of this section are to be read in this light and are not to be understood as admissions about what is in the prior art or what is not in the prior art.

Due to the big bandwidth expansion of traditional communication public radio interface (CPRI) based in-phase/quadrature (I/Q) transmission, the next transportation interface between baseband and radio is quickly transforming from a time division multiplex (TDM) based interface to a packet based interface. As part of the change, network synchronization also evolves to be packet based. For example, a precision time protocol (PTP), as defined in the Institute of Electrical and Electronic Engineers (IEEE) 1588 standard, is becoming one of the most promising candidates for implementing the clock synchronization of packet networks. In a PTP network, the time/frequency for network synchronization is distributed across a master/slave timing tree. However, there may be misalignment between timing distribution and data/control/management distribution. In addition, the rebuilt of a timing tree due to a network fault or a timing source failure may reverse master/slave roles on some network nodes and result in performance oscillation on these nodes.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Communication systems involving multiple devices often require accurate timing in order to facilitate, for example, event synchronization and data correlation. For example, a time transfer protocol such as PTP may be used to synchronize clocks in a communication network such as a radio access network (RAN), a local area network (LAN) or the like. However, the synchronization performance in a PTP network may be affected negatively due to the instability of a timing tree structure. Therefore, it may be desirable to provide an effective synchronization mechanism for enabling stable synchronization of clocks in a dynamic network environment.

The present disclosure proposes a solution for cross domain synchronization in a communication network, which can isolate timing distribution and node faults through clock domain separation, thereby maintaining alignment between timing distribution and data/control/management distribution and avoiding a master/slave role reversal.

According to a first aspect of the present disclosure, there is provided a method implemented at a first network node. The method may comprise receiving a report of clock quality of a second network node from a third network node. A clock of the first network node is selected as a master clock for synchronization in a first timing domain, a clock of the second network node is selected as a master clock for synchronization in a second timing domain, and the third network node is attached to at least the first timing domain and the second timing domain. Based at least in part on the received report, it may be determined whether to synchronize the first timing domain to the second timing domain. In response to the determination of synchronizing the first timing domain to the second timing domain, the first network node can obtain timing information of the second network node from the third network node. The method may further comprise tuning the clock of the first network node to synchronize the first timing domain to the second timing domain, based at least in part on the timing information of the second network node.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon for use with a computer. The computer program codes may comprise code for performing any step of the method according to the first aspect of the present disclosure.

According to a fourth aspect of the present disclosure, there is provided an apparatus. The apparatus may comprise a receiving module, a determining module, an obtaining module and a tuning module. In accordance with some exemplary embodiments, the receiving module may be operable to carry out at least the receiving step of the method according to the first aspect of the present disclosure. The determining module may be operable to carry out at least the determining step of the method according to the first aspect of the present disclosure. The obtaining module may be operable to carry out at least the obtaining step of the method according to the first aspect of the present disclosure. The tuning module may be operable to carry out at least the tuning step of the method according to the first aspect of the present disclosure.

According to a fifth aspect of the present disclosure, there is provided a method implemented at a third network node. The method may comprise transmitting a report of clock quality of a second network node to a first network node. A clock of the first network node is selected as a master clock for synchronization in a first timing domain, a clock of the second network node is selected as a master clock for synchronization in a second timing domain, and the third network node is attached to at least the first timing domain and the second timing domain. The method may further comprise providing timing information of the second network node to the first network node for enabling the first timing domain to be synchronized to the second timing domain, in response to a request for the timing information of the second network node from the first network node.

In accordance with an exemplary embodiment, the method according to the fifth aspect of the present disclosure may further comprise receiving timing information of the first network node distributed from the first network node within the first timing domain. The timing information of the first network node may be based at least in part on the timing information of the second network node.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon for use with a computer. The computer program codes may comprise code for performing any step of the method according to the fifth aspect of the present disclosure.

According to an eighth aspect of the present disclosure, there is provided an apparatus. The apparatus may comprise a transmitting module and a providing module. In accordance with some exemplary embodiments, the transmitting module may be operable to carry out at least the transmitting step of the method according to the fifth aspect of the present disclosure. The providing module may be operable to carry out at least the providing step of the method according to the fifth aspect of the present disclosure.

In accordance with an exemplary embodiment, the selection of the master clock among clocks of network nodes within one of the first timing domain and the second timing domain may be independent of network nodes within the other of the first timing domain and the second timing domain.

In accordance with an exemplary embodiment, the report of the clock quality of the second network node may be triggered periodically or by a predefined event. For example, the predefined event may comprise at least one of: a change of clock quality of at least one master clock sensed at the third network node; and a query for clock quality of at least one master clock sensed at the third network node.

In accordance with an exemplary embodiment, the clock quality of the second network node may be better than clock quality of any other network node of which the clock quality is reported to the first network node.

In accordance with an exemplary embodiment, the clock quality of the second network node may be equal to clock quality of at least another network node of which the clock quality is reported to the first network node, while a hop count between the first network node and the second network node may be less than a hop count between the first network node and the at least another network node.

In accordance with an exemplary embodiment, the operation of determining whether to synchronize the first timing domain to the second timing domain based at least in part on the received report may comprise: comparing the clock quality of the second network node with clock quality of a local timing source of the first network node; determining to synchronize the first timing domain to the second timing domain, in response to the clock quality of the second network node being better than the clock quality of the local timing source; and determining to synchronize the first timing domain to the local timing source instead of the second timing domain, in response to the clock quality of the second network node being worse than or equal to the clock quality of the local timing source.

In accordance with an exemplary embodiment, the operation of obtaining the timing information of the second network node from the third network node may comprise: transmitting a request for the timing information of the second network node to the third network node; and receiving the timing information of the second network node directly from the third network node.

In accordance with an exemplary embodiment, the timing information of the second network node may be received directly from the third network node periodically or in response to a specified event, during the first timing domain is synchronized to the second timing domain.

In accordance with an exemplary embodiment, the timing information of the second network node may comprise timestamp information associated with the second network node collected at the third network node.

In accordance with an exemplary embodiment, the operation of tuning the clock of the first network node to synchronize the first timing domain to the second timing domain based at least in part on the timing information of the second network node may comprise: generating timing information of the first network node based at least in part on the timing information of the second network node; and distributing the timing information of the first network node to one or more other network nodes within the first timing domain. The one or more other network nodes within the first timing domain may comprise at least the third network node.

In accordance with an exemplary embodiment, the determination of synchronizing the first timing domain to the second timing domain may comprise: determining to update information about clock quality of the first network node and a hop count between the first network node and the second network node. For example, the clock quality of the first network node may be based at least in part on the clock quality of the second network node, and the hop count between the first network node and the second network node may be dependent on a hop count between the second network node and the third network node in the second timing domain.

In accordance with an exemplary embodiment, the first network node and the third network node may be the same network node.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
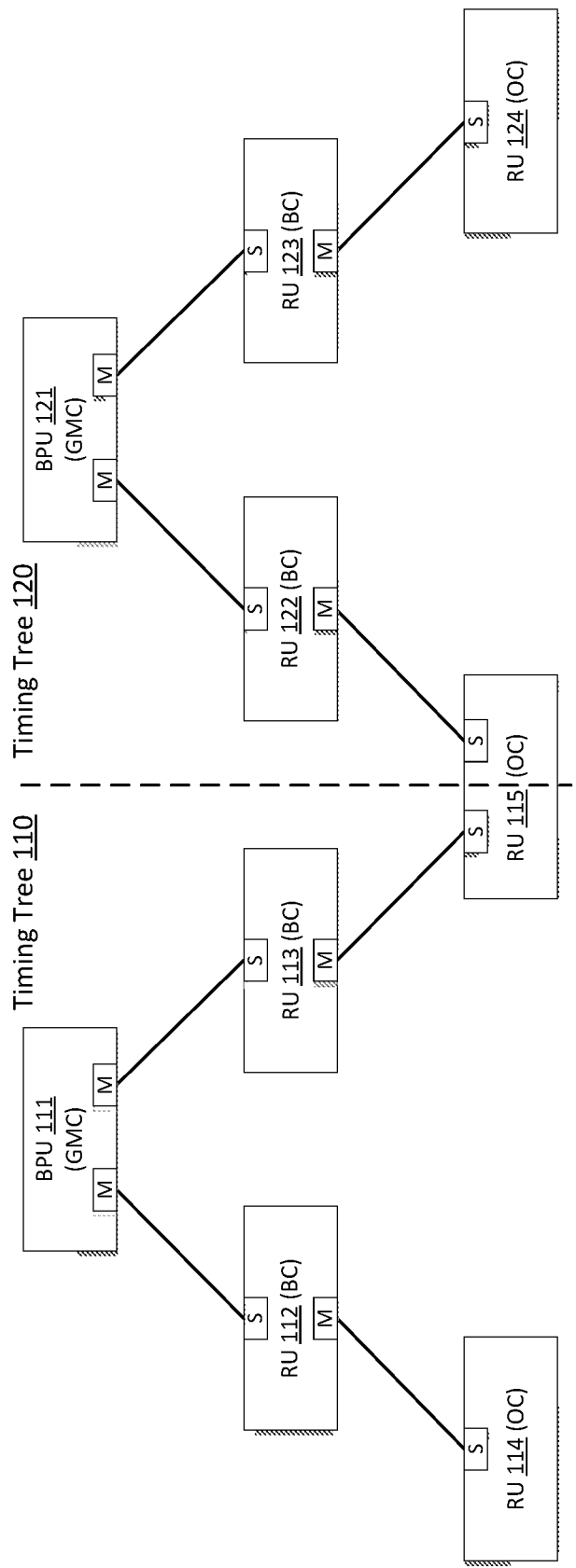
FIG. 1 is a diagram illustrating synchronization in an exemplary radio access network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network node" may refer to a device that communicatively interconnects other devices on a network, such as a baseband processing unit (BPU), a radio unit (RU) or any other communication unit suitable for participating in synchronization of clocks in the network. The network node may be configured with a master and/or slave clock for the network synchronization. Optionally, the network node can provide support for synchronization functions (for example, collecting and/or delivering synchronization information), and/or provide support for application services (for example, facilitating data/control/management distribution).

As used herein, the terms "first", "second", "third" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Distributed clock synchronization is important for a communication system comprising multiple devices, especially when the distance between the devices increase, or when the devices frequently change their locations. Examples of distributed clock synchronization may comprise devices being synchronized to a global positioning system (GPS) satellite, a device's internal clock being synchronized to a timing server, or a group of devices participating in a time transfer protocol such as PTP. For example, these devices may periodically exchange information and adjust their local clocks to match each other.

The PTP may be applicable to systems communicating via packet networks. This protocol can enable heterogeneous systems comprising clocks of various inherent precision, resolution and stability to synchronize. For example, according to the PTP, all participating clocks may be synchronized to the highest quality clock in the network. By running a distributed algorithm, such as the best master clock algorithm (BMCA), each clock in the network identifies the highest quality clock, such as a clock with the best set of characteristics. The highest quality clock may be called as the grand master clock (GMC), and synchronize all other slave clocks. If the GMC is removed from the network, or if its characteristics change in a way such that it is no longer the best quality clock, the BMCA can provide a way for the participating clocks to automatically determine the current best quality clock, which may become the new GMC. The BMCA can provide a fault tolerant and administrative free way of determining the clock used as the timing source for the entire network.

FIG. 1 is a diagram illustrating synchronization in an exemplary radio access network according to an embodiment of the present disclosure. The synchronization of clocks in the exemplary radio access network may be implemented by using the PTP. In this case, the time/frequency information may be distributed across a master/slave tree, in which the GMC acts as a root of the tree and one or more ordinary clocks (OC) act as leaves of the tree. If there is no direct connection between the GMC and the OC, one or more boundary clocks (BC) may be inserted in between them to pass the time/frequency information.

It is noted that some embodiments of the present disclosure are mainly described in relation to IEEE 1588 or PTP specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as exemplary embodiments described herein are applicable to it.

For the synchronization distribution in the exemplary radio access network as shown in FIG. 1, the time/frequency information may be delivered from a BPU to a RU. In an exemplary embodiment, BPU 111 and BPU 121 have the best clocks and with the same clock quality. Thus, these two BPUs may provide two GMCs for timing trees 110 and 120, respectively, as shown in FIG. 1. A RU 112 is cascaded between the BPU 111 and a RU 114, and a RU 113 is cascaded between the BPU 111 and a RU 115. Similarly, a RU 122 is cascaded between the BPU 121 and the RU 115, and a RU 123 is cascaded between the BPU 121 and a RU 124.

The RUs 112, 113, 122 and 123 may provide the BCs in the synchronization distribution. The RUs 114 and 124 are the end of the cascading chain, and accordingly may provide the slave only OC. The RU 115 is a special node, which can accept synchronization from both the timing trees 110 and 120, and may choose the best one to synchronize. For example, the RU 115 may be synchronized to the GMC provided by the BPU 111.

A network node acting as a master node in the timing tree can deliver the time/frequency information to a slave node. A master role of the network node may be denoted by "M", and a slave role of the network node may be denoted by as "S", as shown in FIG. 1. For example, the RU 112 may act as a slave node with respect to the BPU 111 while a master node with the respect to RU 114.

In an exemplary embodiment, the two timing trees 110 and 120 may merge to one timing tree if the clock quality of the BPUs 111 and 121 is not the same. For example, if the BPU 111 has better clock quality than the BPU 121, then the BPU 121 would become a normal BC, and the whole timing tree could elect the BPU 111 as the root. The situation of merging timing trees may happen due to a system configuration, a node fault, or other possible factors.

For example, if the timing budget is good enough so that there is no need to equip a precise timing source on every BPU, then it may be possible that synchronizing the BPU 121 to the BPU 111 is good enough to provide time/frequency accuracy to the most far end tree leaves, like the RU 124. Another example of merging timing trees is that there was a good timing source on the BPU 121 at the beginning but some faults happened on that source later. In this circumstance, the BPU 121 may switch its timing source to the RU 122, which is finally synchronized to the BPU 111 through the RUs 115 and 113.

When two or more timing trees merge to one timing tree, only one BPU would be finally elected to provide the GMC for the network, and the clocks of all other BPUs may act as normal BCs. Thus, the BPU configured with the normal BC would accept timing distribution from its leaf RU which is synchronized to the GMC. However, from data/control/management distribution view, the BPU may need always to act as the root and distribute the information about data/control/management to its attached RUs. It means that the timing distribution according to the merged timing tree is not aligned with the data/control/management distribution anymore.

Figure 2:
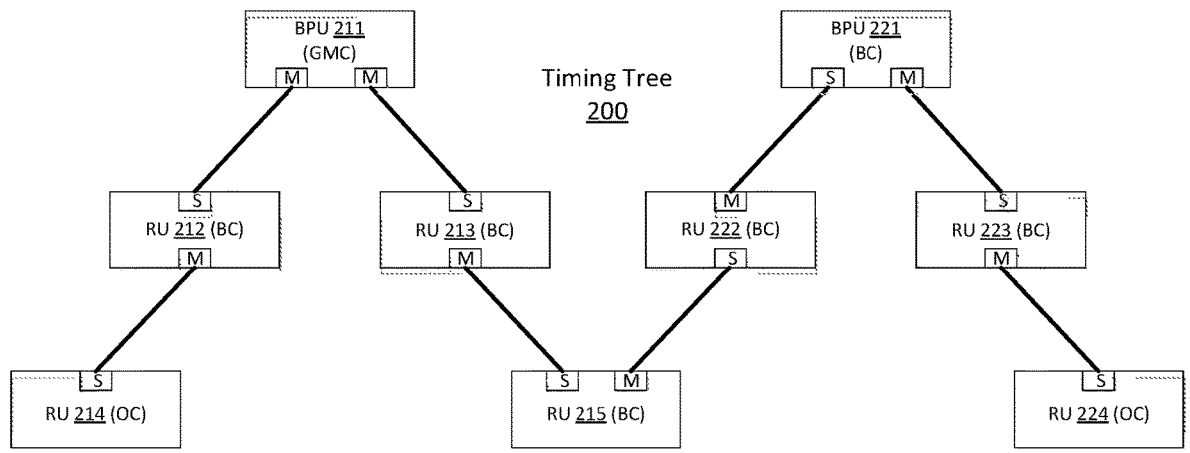
FIGS. 2(a)-(b) are diagrams illustrating an example of fault recovery in a PTP network according to an embodiment of the present disclosure.
Figure 2:
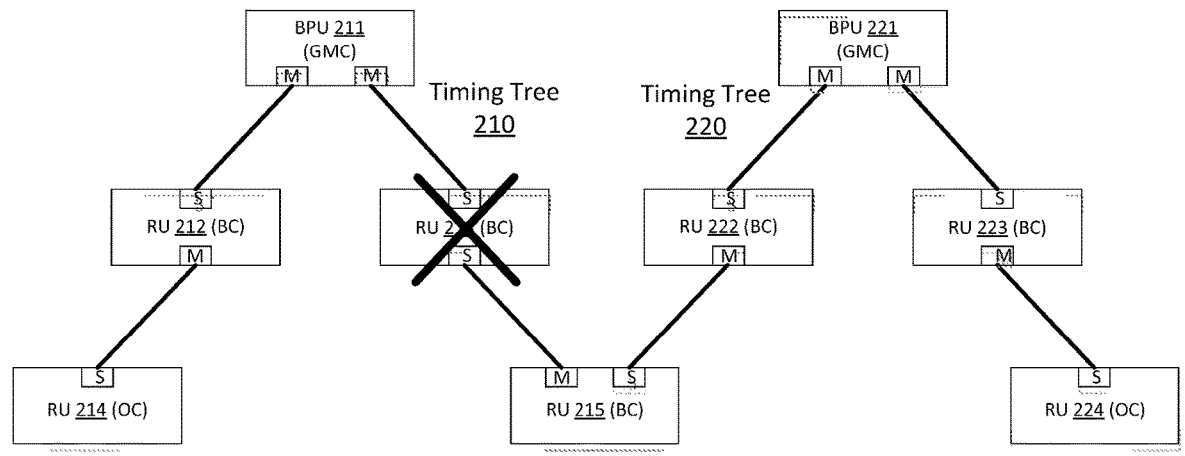

FIGS. 2(*a*)-(*b*) are diagrams illustrating an example of fault recovery in a PTP network according to an embodiment of the present disclosure. In FIG. 2(*a*), a timing tree 200 is built for synchronization information distribution in the network, where a BPU 221 is synchronized to a BPU 211. If a fault happened on a synchronization path between the BPU 211 and the BPU 221, for example a fault happened on a RU 213, the right part of the timing tree 200 would become standalone, and the nodes such as the BPU 221, a RU 222, a RU 223, a RU 224 and a RU 215 need to rebuild a timing tree with the BPU 221, for example, as a root.

As shown in FIG. 2(*b*), the timing tree 200 in FIG. 2(*a*) may be separated as two timing trees 210 and 220 due to fault recovery. The synchronization performance may not be stable during the period of rebuilding a timing tree, for example, due to the best clock selection and the master-slave reversal. For example, the BPU 221, the RU 222 and the RU 215 may act as slave nodes configured with the normal BCs to accept timing distribution from the BPU 211, before the fault happened on the synchronization path between the BPU 211 and the BPU 221, as shown in FIG. 2(*a*). During the period of rebuilding the timing tree, the BPU 221 would change to a master node configured with the GMC for the timing tree 220 to distribute time/frequency information to the RU 222 and the RU 215, as shown in FIG. 2(*b*). Thus, a master/slave role reversal may occur on the BPU 221, the RU 222 and the RU 215.

The problem also will happen when the BPU 211 and the BPU 221 have the same clock quality at the beginning, and later one of their timing sources (such as GPS, free running clock, and/or the like), for instance, the timing source of the BPU 221 becomes unavailable. In this case, the BPU 221 needs to be synchronized to the BPU 211, and accordingly the timing tree would be rebuilt by reversing the master slave roles on the BPU 221, the RU 222 and the RU 215. During this phase, there may be performance oscillation on those network nodes.

Therefore, it is desirable to introduce a synchronization mechanism to achieve more stable network performance and efficient information distribution. For example, the present disclosure proposes a cross domain synchronization mechanism for a communication network which may be separated into several timing domains to perform clock synchronization.

In the proposed synchronization mechanism, according to some exemplary embodiments of the present disclosure, a root network node with the best clock quality in a timing domain such as a PTP domain can provide a master clock such as GMC for synchronization of other network nodes within the timing domain. A cross domain network node attached to this timing domain and one or more other timing domains may report clock quality of the one or more other timing domains to the root network node providing the master clock. Through clock quality comparison across timing domains, the clock synchronization can be performed across different timing domains.

Figure 3:
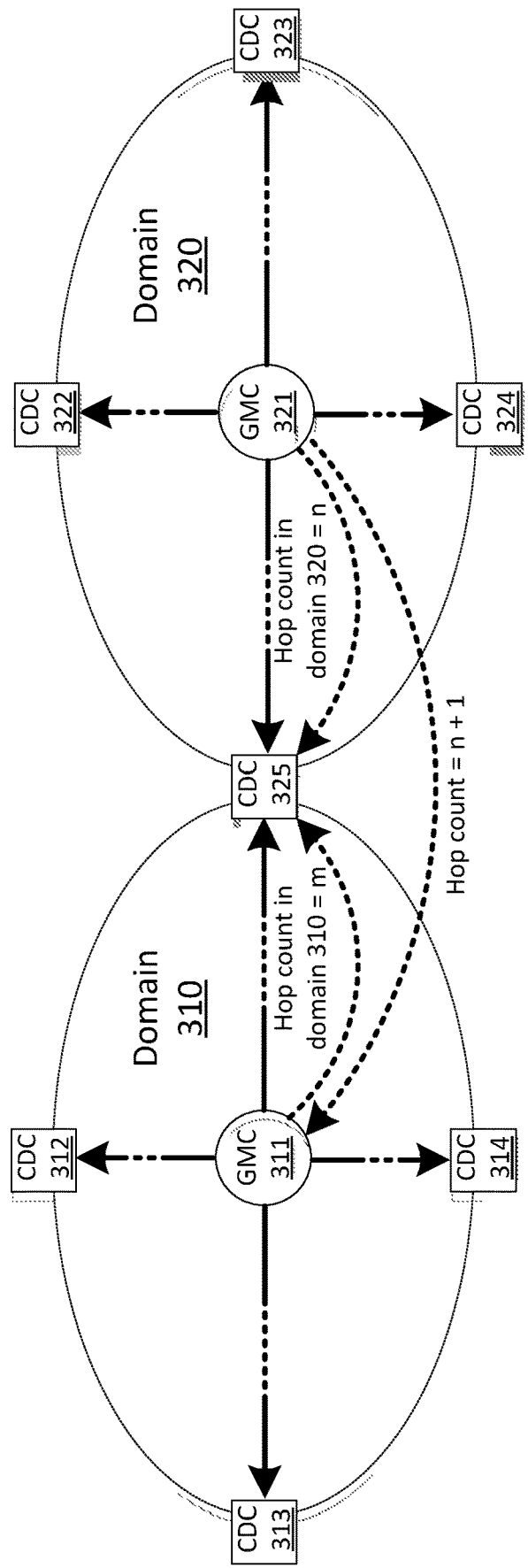
FIG. 3 is a diagram illustrating cross domain synchronization according to an embodiment of the present disclosure.

FIG. 3 is a diagram illustrating cross domain synchronization according to an embodiment of the present disclosure. The proposed cross domain synchronization can be applied to a network which may be separated into several timing domains, such as domains 310 and 320 as shown in FIG. 3. The GMC such as GMC 311 or GMC 321 may be elected in a selection process of the best master clock, and a timing tree may be built for the frequency/time distribution within a timing domain.

It is noted that during the selection process of the best master clock for a timing domain, only the clock quality within the timing domain would be compared. As such, even the GMC 321 in the domain 320 has better clock quality than the GMC 311 in the domain 310, the GMC 311 instead of the GMC 321 would be elected as a root of the timing tree in the domain 310. The clock quality of the GMC in a domain may be used to indicate the clock quality of that domain.

In the exemplary embodiment, a node attached to at least two domains may be referred to as a cross domain node, and accordingly can support a function of a cross domain clock (CDC) in the cross domain synchronization. For simplicity, a node which can support a function of GMC herein may be denoted by GMC. Similarly, a node which can support a function of CDC herein may be denoted by CDC. For example, in FIG. 3, cross domain nodes attached to the domain 310 are denoted by CDCs 312, 313, 314 and 325, and cross domain nodes attached to the domain 320 are denoted by CDCs 322, 323, 324 and 325. The domains connected to the same cross domain node may be regarded as adjacent domains to each other. For example, the CDC 325 in FIG. 3 is at least attached to the domains 310 and 320, and thus the domains 310 and 320 are adjacent domains to each other.

According to an exemplary embodiment, when a timing tree is built for a domain, a root node in the domain, such as the GMC 311, may select its timing source by comparing its local timing source (for example, GPS, free running clock, and/or the like) with all adjacent domains. Alternatively, the comparison also may be performed between the local timing source and an adjacent domain which is selected from all adjacent domains as it has the best clock quality. The clock quality of respective adjacent domains may be reported by the corresponding cross domain nodes to the root node. If the local timing source has better clock quality than all adjacent domains, then the GMC 311 may distribute the synchronization information such as time/frequency as normal. Otherwise, the GMC 311 may be synchronized to the GMC in the selected adjacent domain.

Figure 6:
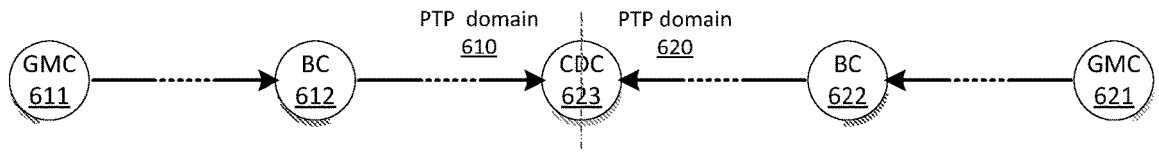
FIGS. 6(a)-(c) are diagrams illustrating remote timing sensing according to an embodiment of the present disclosure.
Figure 6:
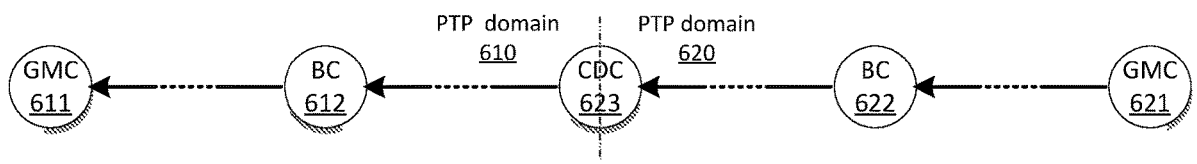
Figure 6:
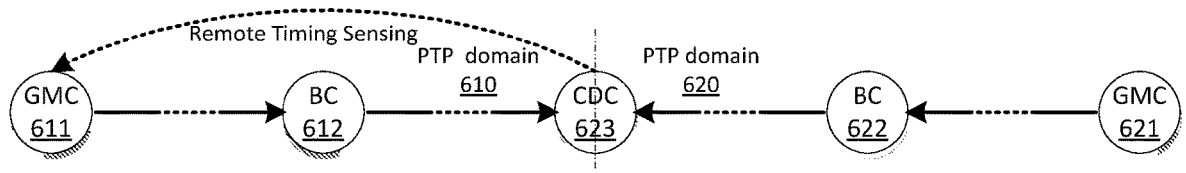

For example, if the domain 320 has better clock quality than the local timing source of the GMC 311, then the GMC 311 may ask the CDC 325 attached to the domain 320 to provide timing information comprising at least timestamp information of the GMC 321, for example, by a process of remote timing sensing as illustrated later in FIG. 6(a)-FIG. 7. With the provided timing information of the domain 320, the GMC 311 can tune its clock and distribute synchronization information within the domain 310, without reversing the master slave roles on the timing tree in the domain 310. Correspondingly, the GMC 311 may update its clock quality with the clock quality of the GMC 321, and optionally a hop count between the GMC 311 and the GMC 321.

In accordance with an exemplary embodiment, a hop count between two nodes can reflect a distance between the two nodes. For example, a hop count between two nodes within the same domain may be represented by the number of intermediate nodes between the two nodes plus one. Here the intermediate nodes may refer to those nodes through which the message delivery between the two nodes would pass. For example, if the number of intermediate nodes between the GMC 311 and the CDC 325 in the domain 310 is (m−1), then the hop count between the GMC 311 and the CDC 325 in the domain 310 is m. Similarly, if the number of intermediate nodes between the GMC 321 and the CDC 325 in the domain 320 is (n−1), then the hop count between the GMC 321 and the CDC 325 in the domain 320 is n.

When determining a hop count between two nodes located within different domains, a cross domain node and root nodes associated with the different domains also need to be considered. For example, if the GMC 311 is synchronized to the GMC 321, then the hop count between the GMC 311 and the GMC 321 in the domain 310 is (n+1), as shown in FIG. 3, and the hop count between the CDC 325 and the GMC 321 in the domain 310 is (m+n+1).

In accordance with an exemplary embodiment, the GMC 311 may consider the hop count information when determining its timing source. For example, if clock quality of the domain 320 and another adjacent domain of the domain 310 is the same, and better than that of other adjacent domains and the local timing source of the GMC 311, then the GMC 321 may be selected as the timing source of the GMC 311 in case that the hop count between the GMC 311 and the GMC 321 is less than that between the GMC 311 and the GMC of the another adjacent domain.

Although the exemplary clock synchronization in FIG. 3 is illustrated with respect to a network environment such as a PTP network, it will be appreciated that other network scenarios also may benefit from the synchronization mechanism described here.

Figure 4:
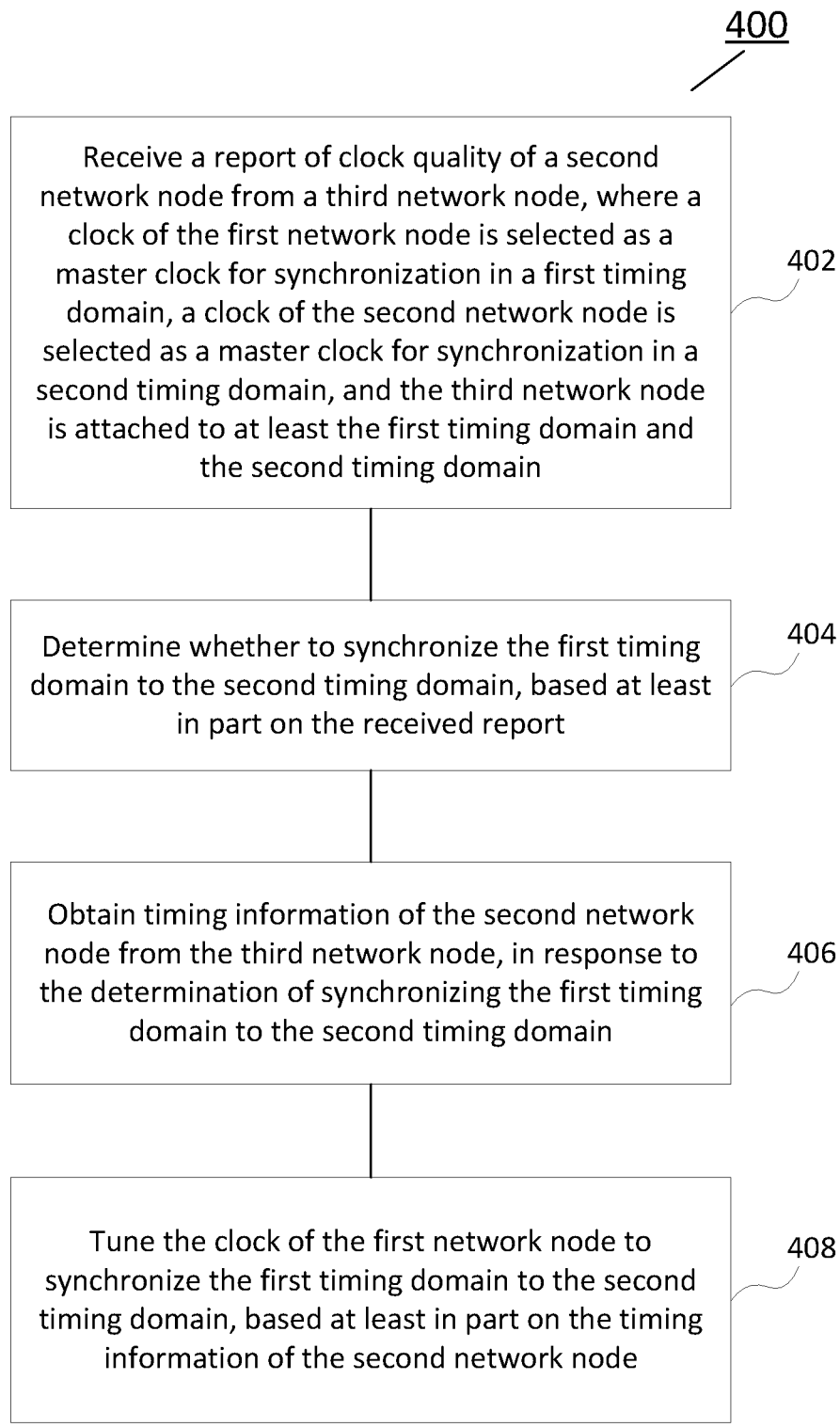
FIG. 4 is a flowchart illustrating a method according to an embodiment of the present disclosure.

FIG. 4 is a flowchart illustrating a method 400 according to an embodiment of the present disclosure. The method 400 illustrated in FIG. 4 may be performed by an apparatus implemented at a network node or communicatively coupled to a network node. In accordance with an exemplary embodiment, the network node may comprise a first network node, such as a BPU or any other communication unit being capable of providing a master clock for synchronization in a communication network.

In particular, the communication network such as a PTP network may comprise several timing domains such as PTP domains.

According to the exemplary method 400 illustrated in FIG. 4, the first network node (such as the GMC 311 in FIG. 3) may receive a report of clock quality of a second network node (such as the GMC 321 in FIG. 3) from a third network node (such as the CDC 325 in FIG. 3), as shown in block 402. In an exemplary embodiment, a clock of the first network node may be selected as a master clock for synchronization in a first timing domain, a clock of the second network node may be selected as a master clock for synchronization in a second timing domain, and the third network node may be attached to at least the first timing domain and the second timing domain. For simplicity, the clock quality of a network node which provides a master clock for synchronization in a timing domain herein is also referred to as the clock quality of the timing domain.

In accordance with an exemplary embodiment, a master clock for synchronization in a timing domain may be selected based at least in part on the BMCA or any other suitable clock selection algorithm. For example, a clock with the best set of characteristics (such as the highest clock quality) in the timing domain may be identified as the master clock. In an exemplary embodiment, the selection of the master clock among clocks of network nodes within one of the first timing domain and the second timing domain may be independent of network nodes within the other of the first timing domain and the second timing domain. Thus, the selection of the master clock is isolated within a timing domain. For example, a network node in a timing domain would not be selected as the master clock in another timing domain, even if this network node has better clock quality than a network node having the best clock quality in the another timing domain.

In accordance with an exemplary embodiment, the report of the clock quality of the second network node may be triggered periodically or by a predefined event. For example, the predefined event may comprise at least one of: a change of clock quality of at least one master clock sensed at the third network node; and a query for clock quality of at least one master clock sensed at the third network node. The clock quality of the at least one master clock sensed at the third network node may comprise the clock quality of the second network node. Alternatively or additionally, the clock quality of the at least one master clock sensed at the third network node may comprise clock quality of a master clock in another timing domain different from the first timing domain and the second timing domain.

Accordingly, the third network node as a cross domain node may report the clock quality of the second network node to the first network node in a certain interval of time or as required. For example, the report of the clock quality of the second network node may be triggered due to a change of the clock quality of the second network node, and/or a query for the clock quality of the second network node from the first network node.

Optionally, the third network node may report to the first network node, in addition to the clock quality of the second network node, clock quality of at least another timing domain to which the third network node is attached. For example, the third network node may report clock quality of all timing domains to which the third network node is attached. In this case, if the clock quality of any attached timing domain changes, the third network node may report the clock quality of the second network node to the first network node along with the clock quality of other timing domains, even if the clock quality of the second network node is unchanged. Similarly, in response to a request for the clock quality of other timing domain than the second timing domain, the third network node may also report the clock quality of the second network node along with the requested clock quality of the other timing domain to the first network node.

Based at least in part on the received report, the first network node can determine whether to synchronize the first timing domain to the second timing domain, as shown in block 404. It will be appreciated that the first network node may also receive other clock quality reports from one or more cross domain nodes comprising the third network node, in addition to the clock quality report of the second network node. The determination as to which timing domain may be a candidate timing domain for synchronizing the first timing domain may be performed, for example, by comparing all of the clock quality reported to the first network node.

In accordance with an exemplary embodiment, the clock quality of the second network node may be better than clock quality of any other network node of which the clock quality is reported to the first network node. Alternatively, the clock quality of the second network node may be equal to clock quality of at least another network node of which the clock quality is reported to the first network node, while a hop count between the first network node and the second network node is less than a hop count between the first network node and the at least another network node. In any of the two cases, the second timing domain may be determined as the candidate timing domain for synchronizing the first timing domain, and further compared with a local timing source of the first network node, such as the GPS, a free running clock, and/or the like.

In accordance with an exemplary embodiment, the operation of determining whether to synchronize the first timing domain to the second timing domain based at least in part on the received report may comprise comparing the clock quality of the second network node with the clock quality of the local timing source of the first network node. In response to the clock quality of the second network node is better than the clock quality of the local timing source, it may be determined to synchronize the first timing domain to the second timing domain. Alternatively, in response to the clock quality of the second network node is worse than or equal to the clock quality of the local timing source, it may be determined to synchronize the first timing domain to the local timing source instead of the second timing domain.

In accordance with an exemplary embodiment, the determination of synchronizing the first timing domain to the second timing domain may comprise: determining to update information about clock quality of the first network node and a hop count between the first network node and the second network node. For example, the clock quality of the first network node may be updated based at least in part on the clock quality of the second network node, since the first network node is to be synchronized to the second network node. Correspondingly, the hop count between the first network node and the second network node may be dependent on a hop count between the second network node and the third network node in the second timing domain, as described in connection with FIG. 3.

In response to the determination of synchronizing the first timing domain to the second timing domain, the first network node can obtain timing information of the second network node from the third network node, as shown in block 406. In accordance with an exemplary embodiment, the timing information may comprise time information, frequency information, and/or any other information related to clock synchronization. For example, the timing information of the second network node may comprise timestamp information associated with the second network node collected at the third network node.

In accordance with an exemplary embodiment, the operation of obtaining the timing information of the second network node from the third network node may comprise: transmitting a request for the timing information of the second network node to the third network node, and receiving the timing information of the second network node directly from the third network node. During the first timing domain is synchronized to the second timing domain, the timing information of the second network node may be received directly from the third network node periodically or in response to a specified event. For example, the specified event may comprise a change of the timing information of the second network node, a request for the timing information of the second network node, and/or the like.

It will be appreciated that it is also possible to determine to synchronize the first timing domain to another timing domain than the second timing domain, for example, in response to that timing domain having better clock quality than any other adjacent timing domain of the first timing domain and the local timing source of the first network node. In this case, the first network node could obtain timing information of the master clock in that timing domain from the corresponding cross domain node.

Based at least in part on the timing information of the second network node, the clock of the first network node can be tuned to synchronize the first timing domain to the second timing domain, as shown in block 408. In accordance with an exemplary embodiment, the operation of tuning the clock of the first network node to synchronize the first timing domain to the second timing domain may comprise generating timing information of the first network node based at least in part on the timing information of the second network node. The generated timing information of the first network node may be distributed from the first network node to one or more other network nodes within the first timing domain, which may comprise at least the third network node. In this way, the first timing domain may be synchronized to the second timing domain, while the nodes in the first timing domain may not be required to reverse their roles in the master-slave timing tree.

In accordance with an exemplary embodiment, the first network node and the third network node may be the same network node. In this embodiment, the communication of the clock quality report and the timing information between the first network node and the third network node as described previously may be performed through internal ports of this specific network node.

For example, a first PTP port of the specific network node connected to the first timing domain may represent this network node to participate in the master clock selection and the timing distribution in the first timing domain. On the other hand, a second PTP port of the specific network node connected to the second timing domain may receive the timing information of the second network node which has better clock quality than that sensed through any other PTP port of the specific network node. Then the specific network node could tune its clock based at least in part on the timing information of the second network node, and generate new timing information for distribution within the first timing domain through the first PTP port.

Figure 5:
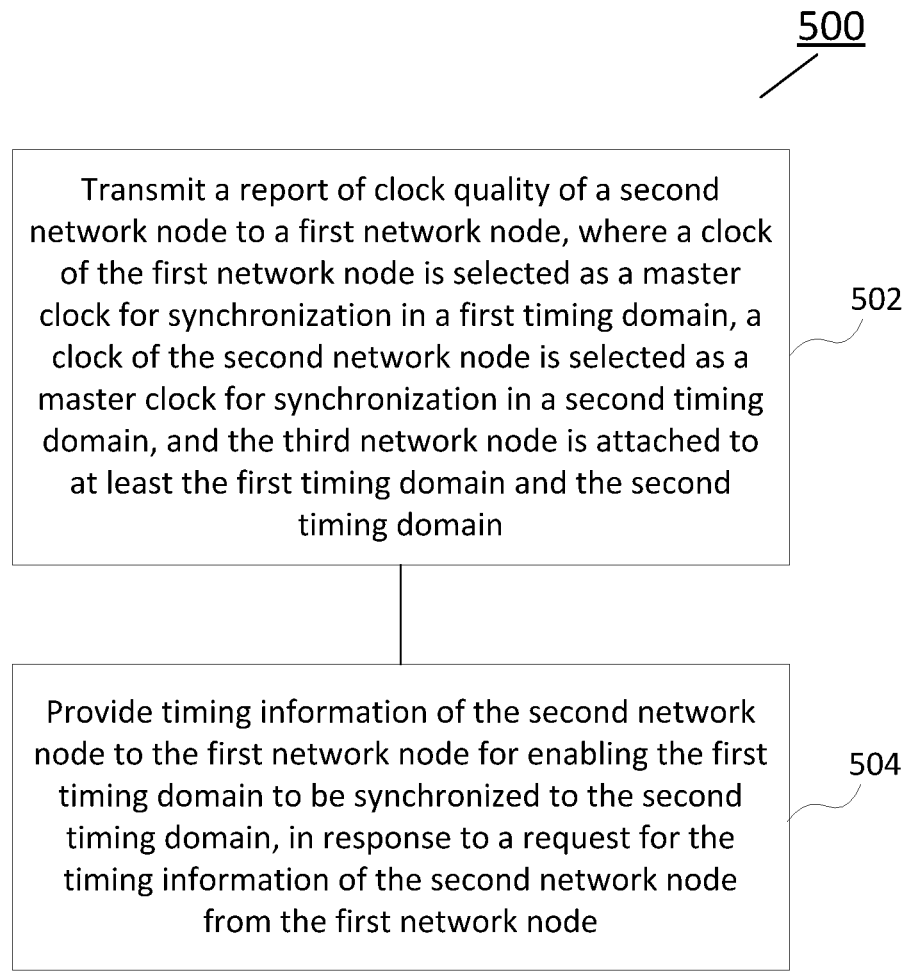
FIG. 5 is a flowchart illustrating a method according to another embodiment of the present disclosure.

FIG. 5 is a flowchart illustrating a method 500 according to another embodiment of the present disclosure. The method 500 illustrated in FIG. 5 may be performed by an apparatus implemented at a network node or communicatively coupled to a network node. In accordance with an exemplary embodiment, the network node may comprise the third network node as described in connection with FIG. 4, such as a RU or any other communication unit being capable of supporting a function of a cross domain clock for network synchronization. In the exemplary embodiment, the third network node may be attached to at least a first timing domain and a second timing domain. In the first timing domain, a clock of a first network node may be selected as a master clock, and in the second timing domain a clock of a second network node may be selected as a master clock.

Corresponding to operations of the exemplary method for cross domain synchronization as illustrated in FIG. 4, the third network node may transmit a report of clock quality of the second network node to the first network node, as shown in block 502. The report of the clock quality of the second network node may be triggered periodically or by a predefined event. It could be realized that reports of clock quality of respective master clocks in one or more other timing domains may also be transmitted to the first network node from the third network node, considering that the third network node may be attached to the one or more other timing domains besides the first and second timing domains.

In accordance with an exemplary embodiment, a cross domain node such as the third network node may be synchronized to a timing domain selected from a plurality of timing domains to which the cross domain node is attached, based at least in part on clock quality of the plurality of timing domains. For example, the third network node may choose to be synchronized to a timing domain which has the best clock quality among the plurality of timing domains.

Optionally, hop counts between this cross domain node and the respective root network nodes (which provide the corresponding master clocks) of the plurality of timing domains also may be considered in choosing a target timing domain for synchronization. For example, if clock quality of two or more attached timing domains is determined as the best clock quality, the third network node may choose to be synchronized to a timing domain of which the root network node has the least hop count away from the third network node.

In accordance with an exemplary embodiment, the clock quality of the second network node may be reported to the first network node, as the best clock quality collected at the third network node. Alternatively, the clock quality of the second network node may be reported to the first network node along with the best clock quality collected at the third network node, for example, in case that the third network node reports all of its collected clock quality to the first network node.

In accordance with an exemplary embodiment, the clock quality of the second network node may be better than clock quality of any other network node of which the clock quality is reported to the first network node. Alternatively, the clock quality of the second network node may be equal to clock quality of at least another network node of which the clock quality is reported to the first network node, while a hop count between the first network node and the second network node is less than a hop count between the first network node and the at least another network node. As described with respect to FIG. 4, the clock quality of the second network node may be better than clock quality of a local timing source of the first network node. In this case, the first network node may determine to be synchronized to the second network node and send a request for timing information of the second network node to the third network node.

In response to a request for timing information of the second network node from the first network node, the third network node may provide the timing information of the second network node to the first network node for enabling the first timing domain to be synchronized to the second timing domain, as shown in block 504. Optionally, during the first timing domain is synchronized to the second timing domain, the timing information of the second network node may be provided directly to the first network node periodically or in response to a specified event. In an exemplary embodiment, the third network node may transmit the collected timing information of the second network node, which may comprise timestamp information associated with the second network node, to the first network node, for example, in response to a change or a request of the timing information.

In accordance with an exemplary embodiment, the third network node may optionally receive timing information of the first network node distributed from the first network node within the first timing domain. The timing information of the first network node may be based at least in part on the timing information of the second network node. Alternatively, the first network node and the third network node may be the same network node. In this case, the first/third network node would tune its clock based at least in part on the timing information of the second network node, and distribute its updated timing information to other network nodes within the first timing domain.

In the proposed solutions as described according to exemplary embodiments, a concept of timing domain or clock domain may be introduced to achieve more stable synchronization performance in a communication network. Through timing/clock domain separation, a master clock which distributes synchronization information to slave clocks in a timing domain may be selected independently of those clocks in other timing domain.

On the other hand, clock quality comparison may be performed across domains. For example, a first GMC may get a second GMC's clock quality report from a CDC, and determine whether to use its own timing source or synchronize to the second GMC providing better clock quality. If the first GMC determines to synchronize to the second GMC, it could directly obtain the time/frequency information (for instance, timestamps) from the CDC, for example, through a process of remote timing sensing. Based at least in part on the obtained time/frequency information, the first GMC can estimate the corresponding time/frequency offset, and tune its clock to enable the first GMC to be synchronized to the second GMC. One of many advantages achieved by the proposed solution is that it may avoid the synchronization topology rebuilding, so that the synchronization performance re-convergence time due to the synchronization source switching could be reduced a lot.

FIGS. 6(a)-(c) are diagrams illustrating remote timing sensing according to an embodiment of the present disclosure. For example, the remote timing sensing may be a process that a GMC asks a CDC to directly provide the timestamp information collected at the CDC. According to the timestamp information, the GMC can tune its clock to implement cross domain synchronization. In the exemplary embodiment shown in FIGS. 6(a)-(c), a GMC 611 and a BC 612 are located in a PTP domain 610, a GMC 621 and a BC 622 are located in a PTP domain 620, and a CDC 623 is attached to the PTP domains 610 and 620.

In FIG. 6(a), both GMC 611 and GMC 621 may pass the time/frequency information to the CDC 623 in a hop-by-hop way. The CDC 623 may finally choose the GMC 621 to synchronize. According to the conventional clock synchronization, if the GMC 611 wants to be synchronized to the GMC 621, it needs to firstly rebuild the synchronization topology by reversing the synchronization direction, and then synchronize to the GMC 621 in a hop-by-hop way, as shown in FIG. 6(b).

By the proposed remote timing sensing as shown in FIG. 6(c), however, the GMC 611 can directly ask the CDC 623 for timestamp information on a PTP port within the PTP domain 610, and then tune a clock of the GMC 611 according to the timestamp information so as to be synchronized to the GMC 621. This process is called as the remote timing sensing since some operations associated with clock synchronization such as phase frequency detection may be performed remotely from the GMC 611.

Figure 7:
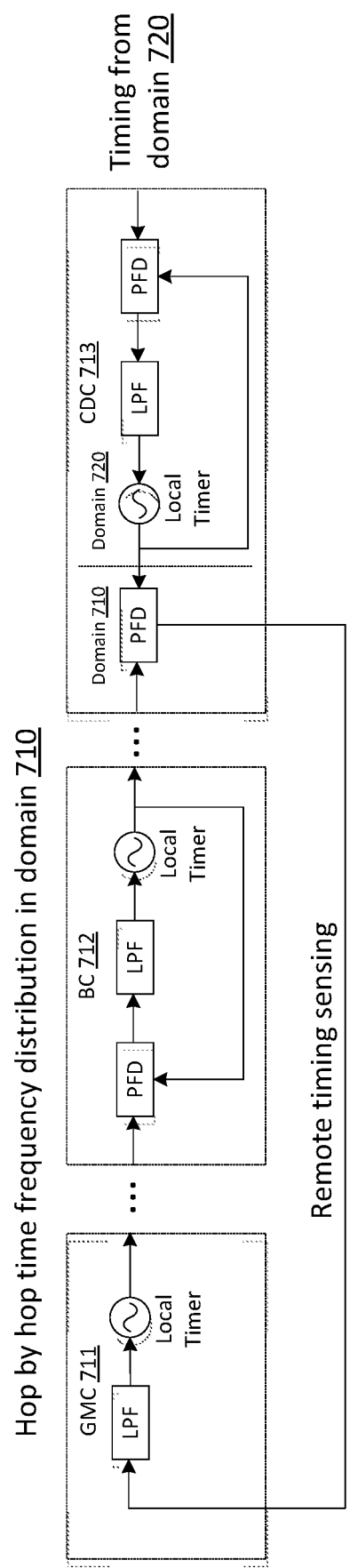
FIG. 7 is a diagram illustrating an exemplary timing model for remote timing sensing according to an embodiment of the present disclosure.

FIG. 7 is a diagram illustrating an exemplary timing model for remote timing sensing according to an embodiment of the present disclosure. In the simplified timing model as shown in FIG. 7, a CDC node 713 is attached to two domains 710 and 720. A GMC node 711 in the domain 710 may comprise a low pass filter (LPF) and a local timer. A BC node 712 in the domain 710 may comprise a phase frequency detection (PFD) component, a LPF and a local timer. Similarly, the CDC node 713 may comprise a LPF, a local timer, and two PFD components respectively used for the domains 710 and 720.

In an exemplary embodiment, the GMC node 711 may distribute its time/frequency information to the remote CDC node 713 in a hop-by-hop way, for example, through the BC node 712. The CDC node 713, which may be synchronized to the domain 720, can perform the PFD by collecting timestamp information on its PTP port within the domain 710. Through this PTP port, the time/frequency information in the domain 710 may be received at the CDC node 713. In case that the CDC node 713 is synchronized to the domain 720, the timestamp information sent from the CDC node 713 to the GMC node 711 by a process of remote timing sensing may at least partly indicate time/frequency information from the domain 720. Based at least in part on the timestamp information sent from the CDC node 713, the GMC node 711 can tune its local timer so that the whole timing chain in the domain 710 could be synchronized to the domain 720.

Figure 8:
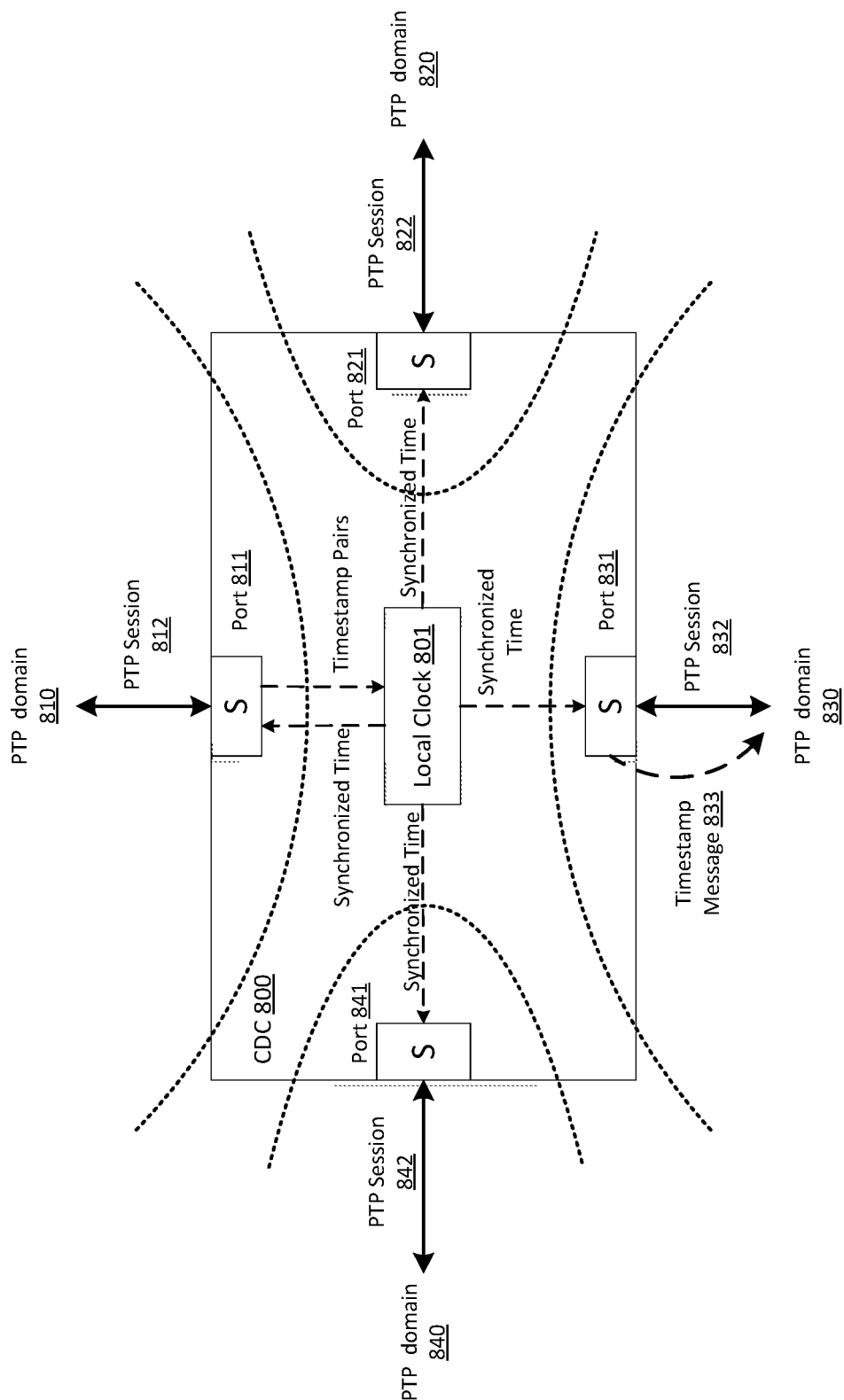
FIG. 8 is a diagram illustrating an exemplary cross domain clock (CDC) node structure according to an embodiment of the present disclosure.

FIG. 8 is a diagram illustrating an exemplary CDC node structure according to an embodiment of the present disclosure. The CDC node as described herein may connect to one or more clock/timing domains. For example, by running the PTP protocol, the CDC node can receive time and frequency information from all of its attached domains. It will be realized that although the CDC node is often configured as an OC node within a PTP domain, it may be possible to configure the CDC node as a GMC node within a PTP domain.

As shown in FIG. 8, a CDC node 800 in a slave role (which is denoted by "S") may enable respective PTP sessions 812, 822, 832 and 842 with four PTP domains 810, 820, 830 and 840 through corresponding PTP ports 811, 821, 831 and 841. Thus, the CDC node 800 may connect to four clock domains. In an exemplary embodiment, the CDC node 800 may choose a domain with the best clock quality from the attached clock domains to synchronize its local clock 801. For example, the CDC node 800 may choose the PTP domain 810 to synchronize the local clock 801, and get the corresponding timestamp pairs through the PTP port 811. On the other hand, the synchronized time from the local clock 801 may be provided to the PTP ports 811, 821, 831 and 841.

According to an exemplary embodiment, although the CDC node 800 may choose a PTP domain that provides the best clock for synchronization, the CDC node 800 can separately run BMCA on each domain. Thus the CDC node 800 would not pass clock quality from a first domain to a BC node in a second domain, unless that the CDC node 800 itself is a GMC node in the second domain while it chooses the first domain to synchronize its local clock.

During the best master clock selection, the CDC node 800 may report the received clock quality from its attached PTP domains to the respective GMC nodes within the attached domains. For example, a GMC node in the domain 830 can determine if it needs to perform the cross domain synchronization based at least in part on clock quality of the domains 810, 820 and 840 reported from the CDC node 800. If the cross domain synchronization is needed between the domains 810 and 830 because the clock quality from the domain 810 is better, the GMC node in the domain 830 may ask the CDC node 800 to provide timing information associated with the local clock 801 of the CDC node 800. For example, the CDC node 800 may transmit a timestamp message 833 indicating a difference of timestamps between the two domains 810 and 830 to the GMC node in the domain 830 in a process of remote timing sensing. Then the GMC node in the domain 830 can tune its local clock based at least in part on the message 833 received, for example, through the PTP port 831.

Figure 9:
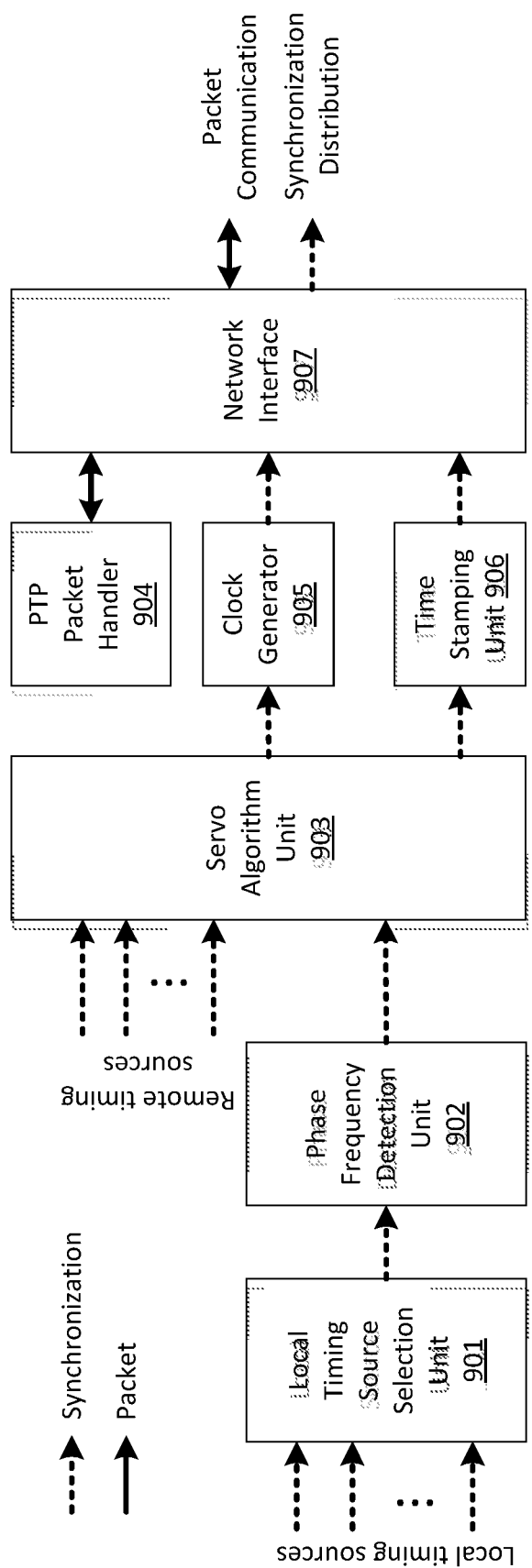
FIG. 9 is a diagram illustrating an exemplary grand master clock (GMC) node according to an embodiment of the present disclosure.

FIG. 9 is a diagram illustrating an exemplary GMC node according to an embodiment of the present disclosure. As shown in FIG. 9, the GMC node may comprise a local timing source selection unit 901, a phase frequency detection unit 902, a servo algorithm unit 903, a PTP packet handler 904, a clock generator 905, a time stamping unit 906, and a network interface 907. The GMC node can support a function of remote timing sensing as described in connection with FIG. 6(a)-FIG. 7. It will be appreciated that the GMC node may comprise more or less functional units than those schematically shown in FIG. 9, and may employ other suitable functional units different from that shown in FIG. 9.

As shown in FIG. 9, the GMC node may have one or more local timing sources, such as the GPS, a free running clock, and/or the like, which may require additional local PFD for a servo algorithm. In addition, the GMC node also can accept one or more remote timing sources to tune its local clock. Therefore, there may be two types of timing sources available for feeding to the servo algorithm unit 903. According an exemplary embodiment, the remote timing sources, for example, the sampled timestamp information from a CDC node, can be directly fed to the servo algorithm unit 903 without any additional PFD.

As described in connection with FIGS. 3-8, the GMC node may choose the best timing source among the local timing sources and the remote timing sources to synchronize its clock. If a local timing source is chosen, the timing information from this local timing source may be fed to the servo algorithm unit 903 through the PFD unit 902. If it is determined to perform cross domain synchronization, the GMC node may accept the remote sampled timestamp information for the cross domain synchronization and feed it to the servo algorithm unit 903 to control clock generation. Some information for clock synchronization may be provided from the clock generator 905 and the time stamping unit 906 to the network interface 907 for implementing synchronization distribution. The network interface 907 also can facilitate communications of PTP packets provided by the PTP packet handler 904.

The proposed cross domain synchronization solution according to some exemplary embodiments can achieve stable and effective timing synchronization, for example, by performing remote timing sensing at a cross domain node. Taking the advantage of the proposed synchronization mechanism makes it possible to align the timing information distribution with the data/control/management information distribution. For example, on a GMC, synchronization source switching in between a local timing source and an external domain would not have impact to a timing tree structure within a domain in which the GMC is located. On the other hand, a node fault in a communication network may be isolated within a clock domain. The clock domain separation according to some exemplary embodiments can make a fault in a domain not affect the synchronization topology in another domain.

The various blocks shown in FIGS. 1-9 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 10:
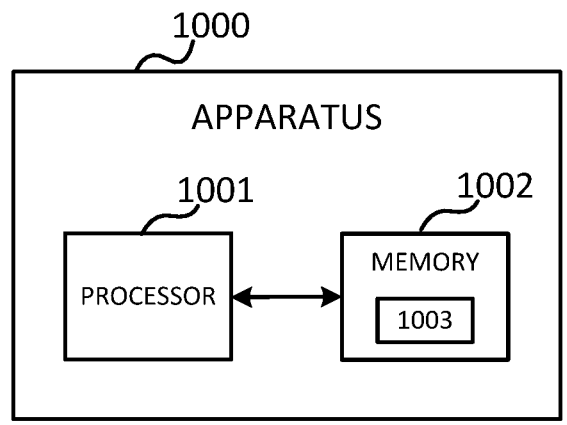
FIG. 10 is a block diagram illustrating an apparatus according to an embodiment of the present disclosure.

FIG. 10 is a block diagram illustrating an apparatus 1000 according to an embodiment of the present disclosure. As shown in FIG. 10, the apparatus 1000 may comprise one or more processors such as processor 1001 and one or more memories such as memory 1002 storing computer program codes 1003. The one or more memories 1002 and the computer program codes 1003 may be configured to, with the one or more processors 1001, cause the apparatus 1000 at least to perform any operation of the method as described in connection with any of FIGS. 4-5. Alternatively or additionally, the one or more memories 1002 and the computer program codes 1003 may be configured to, with the one or more processors 1001, cause the apparatus 1000 at least to perform more or less operations to implement the proposed methods according to the exemplary embodiments of the present disclosure.

Figure 11:
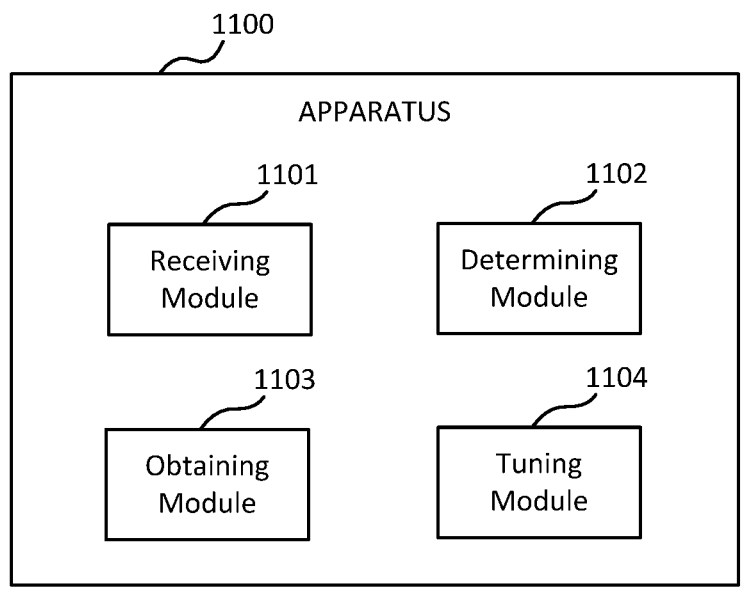
FIG. 11 is a block diagram illustrating an apparatus according to another embodiment of the present disclosure.

FIG. 11 is a block diagram illustrating an apparatus 1100 according to another embodiment of the present disclosure. As shown in FIG. 11, the apparatus 1100 may comprise a receiving module 1101, a determining module 1102, an obtaining module 1103 and a tuning module 1104. In an exemplary embodiment, the apparatus 1100 may be implemented at a network node such as a BPU. The receiving module 1101 may be operable to carry out the operation in block 402, the determining module 1102 may be operable to carry out the operation in block 404, the obtaining module 1103 may be operable to carry out the operation in block 406, and the tuning module 1104 may be operable to carry out the operation in block 408. Optionally, the receiving module 1101, the determining module 1102, the obtaining module 1103 and/or the tuning module 1104 may be operable to carry out more or less operations to implement the proposed methods according to the exemplary embodiments of the present disclosure.

Figure 12:
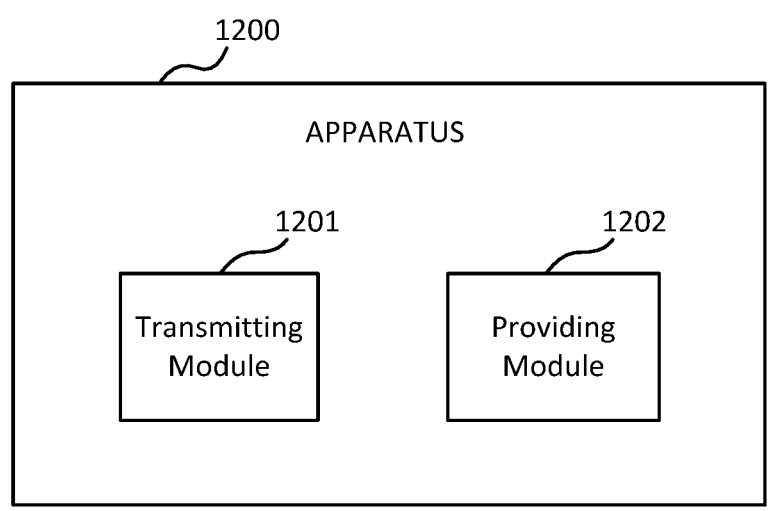
FIG. 12 is a block diagram illustrating an apparatus according to a further embodiment of the present disclosure.

FIG. 12 is a block diagram illustrating an apparatus 1200 according to a further embodiment of the present disclosure. As shown in FIG. 12, the apparatus 1200 may comprise a transmitting module 1201 and a providing module 1202. In an exemplary embodiment, the apparatus 1200 may be implemented at a network node such as a RU. The transmitting module 1201 may be operable to carry out the operation in block 502, and the providing module 1202 may be operable to carry out the operation in block 504. In an exemplary embodiment, the apparatus 1200 may further comprise a receiving module (not shown in FIG. 12) for receiving communication information such as timing information or any other suitable information. Optionally, the transmitting module 1201, the providing module 1202 and/or the receiving module may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a first master clock network node belonging to a first group of network nodes, the method comprising:
   receiving a report of clock quality of a second master clock network node from an intermediate network node, wherein (i) the second master clock network node belongs to a second group of network nodes, (ii) the second group of network nodes is different from the first group of network nodes, (iii) a clock of the first master clock network node is selected as a master clock for synchronization in a first timing domain associated with the first group of network nodes, (iv) a clock of the second master clock network node is selected as a master clock for synchronization in a second timing domain associated with the second group of network nodes, and (v) the intermediate network node is capable of being synchronized to the first time domain and the second time domain;
   determining whether to synchronize the first timing domain to the second timing domain, based at least in part on the received report;
   obtaining timing information of the second master clock network node from the intermediate network node, in response to the determination of synchronizing the first timing domain to the second timing domain; and
   tuning the clock of the first master clock network node to synchronize the first timing domain to the second timing domain, based at least in part on the timing information of the second master clock network node,
   wherein the tuning comprises synchronizing the intermediate network node to the second timing domain.

2. The method according to claim 1, wherein the selection of the master clock among clocks of network nodes within one of the first timing domain and the second timing domain is independent of network nodes within the other of the first timing domain and the second timing domain.

3. The method according to claim 1, wherein the report of the clock quality of the second master clock network node is triggered periodically or by a predefined event.

4. The method according to claim 3, wherein the predefined event comprises at least one of:
   a change of clock quality of at least one master clock sensed at the intermediate network node; and
   a query for clock quality of at least one master clock sensed at the intermediate network node.

5. The method according to claim 1, wherein the clock quality of the second master clock network node is better than clock quality of any other network node of which the clock quality is reported to the first master clock network node.

6. The method according to claim 1, wherein the clock quality of the second master clock network node is equal to clock quality of at least another network node of which the clock quality is reported to the first master clock network node, while a hop count between the first master clock network node and the second master clock network node is less than a hop count between the first master clock network node and the at least another network node.

7. The method according to claim 5, wherein said determining whether to synchronize the first timing domain to the second timing domain based at least in part on the received report comprises:
   comparing the clock quality of the second master clock network node with clock quality of a local timing source of the first master clock network node;
   determining to synchronize the first timing domain to the second timing domain, in response to determining that the clock quality of the second master clock network node is better than the clock quality of the local timing source; and
   determining to synchronize the first timing domain to the local timing source instead of the second timing domain, in response to determining that the clock quality of the second master clock network node is worse than or equal to the clock quality of the local timing source.

8. The method according to claim 1, wherein said obtaining the timing information of the second master clock network node from the intermediate network node comprises:
   transmitting a request for the timing information of the second master clock network node to the intermediate network node; and
   receiving the timing information of the second master clock network node directly from the intermediate network node.

9. The method according to claim 8, wherein the timing information of the second master clock network node is received directly from the intermediate network node periodically or in response to a specified event, during synchronizing of the first timing domain to the second timing domain.

10. The method according to claim 1, wherein the timing information of the second master clock network node comprises timestamp information associated with the second master clock network node collected at the intermediate network node.

11. The method according to claim 1, wherein said synchronizing the first timing domain to the second timing domain based at least in part on the timing information of the second master clock network node-comprises:
   generating timing information of the first master clock network node based at least in part on the timing information of the second master clock network node; and
   distributing the timing information of the first master clock network node to one or more other network nodes within the first timing domain, wherein the one or more other network nodes within the first timing domain comprise at least the intermediate network node.

12. The method according to claim 1, wherein the determination of synchronizing the first timing domain to the second timing domain comprises:
determining to update information about clock quality of the first master clock network node and a hop count between the first master clock network node and the second master clock network node, wherein the clock quality of the first master clock network node is based at least in part on the clock quality of the second master clock network node, and the hop count between the first master clock network node and the second master clock network node is dependent on a hop count between the second master clock network node and the intermediate network node in the second timing domain.

13. A first master clock network node, comprising:
one or more processors; and
one or more memories comprising computer program codes,
the one or more memories and the computer program codes configured to, with the one or more processors, cause the first master clock network node to:
receive a report of clock quality of a second master clock network node from an intermediate network node, wherein (i) the second master clock network node belongs to a second group of network nodes, (ii) the second group of network nodes is different from the first group of network nodes, (iii) a clock of the first master clock network node is selected as a master clock for synchronization in a first timing domain associated with the first group of network nodes, (iv) a clock of the second master clock network node is selected as a master clock for synchronization in a second timing domain associated with the second group of network nodes, and (iv) the intermediate network node is capable of being synchronized to the first time domain and the second time domain;
determine whether to synchronize the first timing domain to the second timing domain, based at least in part on the received report;
obtain timing information of the second master clock network node from the intermediate network node, in response to the determination of synchronizing the first timing domain to the second timing domain; and
tune the clock of the first master clock network node to synchronize the first timing domain to the second timing domain, based at least in part on the timing information of the second master clock network node, wherein the tuning comprises synchronizing the intermediate network node to the second timing domain.

14. A method implemented at an intermediate network node, comprising:
transmitting a report of clock quality of a second master clock network node to a first master clock network node belonging to a first group of network nodes, wherein (i) the second master clock network node belongs to a second group of network nodes, (ii) the second group of network nodes is different from the first group of network nodes, (iii) a clock of the first master clock network node is selected as a master clock for synchronization in a first timing domain associated with the first group of network nodes, (iv) a clock of the second master clock network node is selected as a master clock for synchronization in a second timing domain associated with the second group of network nodes, and (v) the intermediate network node is capable of being synchronized to the first time domain and the second time domain;
receiving from the first master clock network node a request for timing information of the second master clock network node;
after receiving the request for the timing information of the second master clock network node, providing the timing information of the second master clock network node to the first master clock network node for enabling the first timing domain to be synchronized to the second timing domain, in response to a request for the timing information of the second master clock network node from the first master clock network node; and
after providing the timing information of the second master clock network node to the first master clock network node, synchronizing to the first timing domain.

15. The method according to claim 14, wherein the selection of the master clock among clocks of network nodes within one of the first timing domain and the second timing domain is independent of network nodes within the other of the first timing domain and the second timing domain.

16. The method according to claim 14, wherein the report of the clock quality of the second master clock network node is triggered periodically or by a predefined event.

17. The method according to claim 16, wherein the predefined event comprises at least one of:
a change of clock quality of at least one master clock sensed at the intermediate network node; and
a query for clock quality of at least one master clock sensed at the intermediate network node.

18. The method according to claim 14, wherein the clock quality of the second master clock network node is better than clock quality of any other network node of which the clock quality is reported to the first master clock network node.

19. The method according to claim 14, wherein the clock quality of the second master clock network node is equal to clock quality of at least another network node of which the clock quality is reported to the first master clock network node, while a hop count between the first master clock network node and the second master clock network node is less than a hop count between the first master clock network node and the at least another network node.

20. The method according to claim 14, wherein the clock quality of the second master clock network node is better than clock quality of a local timing source of the first master clock network node.

* * * * *